United States Patent [19]
Elorriaga, Jr.

[11] Patent Number: 4,478,438
[45] Date of Patent: Oct. 23, 1984

[54] SWIVEL JOINT

[75] Inventor: Peter Elorriaga, Jr., Kingwood, Tex.

[73] Assignee: Best Industries, Inc., Houston, Tex.

[21] Appl. No.: 442,564

[22] Filed: Nov. 18, 1982

[51] Int. Cl.³ .............................................. F16L 27/00
[52] U.S. Cl. ..................................... 285/276; 285/94;
285/98; 285/281
[58] Field of Search ................. 285/281, 354, 356, 98,
285/276, 94; 384/420

[56] References Cited

U.S. PATENT DOCUMENTS

| 738,503 | 9/1903 | Waters | 285/276 X |
|---|---|---|---|
| 2,705,651 | 4/1955 | Myers | 285/331 X |
| 3,384,428 | 5/1968 | Hodge | 384/420 |
| 4,079,969 | 3/1978 | Wilson et al. | 285/376 X |
| 4,205,866 | 6/1980 | McCracken | 285/281 |

FOREIGN PATENT DOCUMENTS 1435498  5/1976  United Kingdom ................ 285/281

Primary Examiner—Dave W. Arola
Attorney, Agent, or Firm—Pravel, Gambrell, Hewitt & Kimball

[57] ABSTRACT

A swivel joint for handling fluids which is used to connect open-ended male and female pipe sections. A retainer in the form of an annular split ring is mounted circumferentially about the male pipe section in a groove formed on its outer surface. The split ring includes thrust and radial transfer surfaces which cooperate with complementary surfaces formed on solid annular bearings which are disposed generally between the split ring and the female pipe section. The complementary surfaces transmit both radial and thrust loads through the split ring and bearing. An assembly nut connects the male and female pipe sections, split ring and bearing together.

8 Claims, 6 Drawing Figures

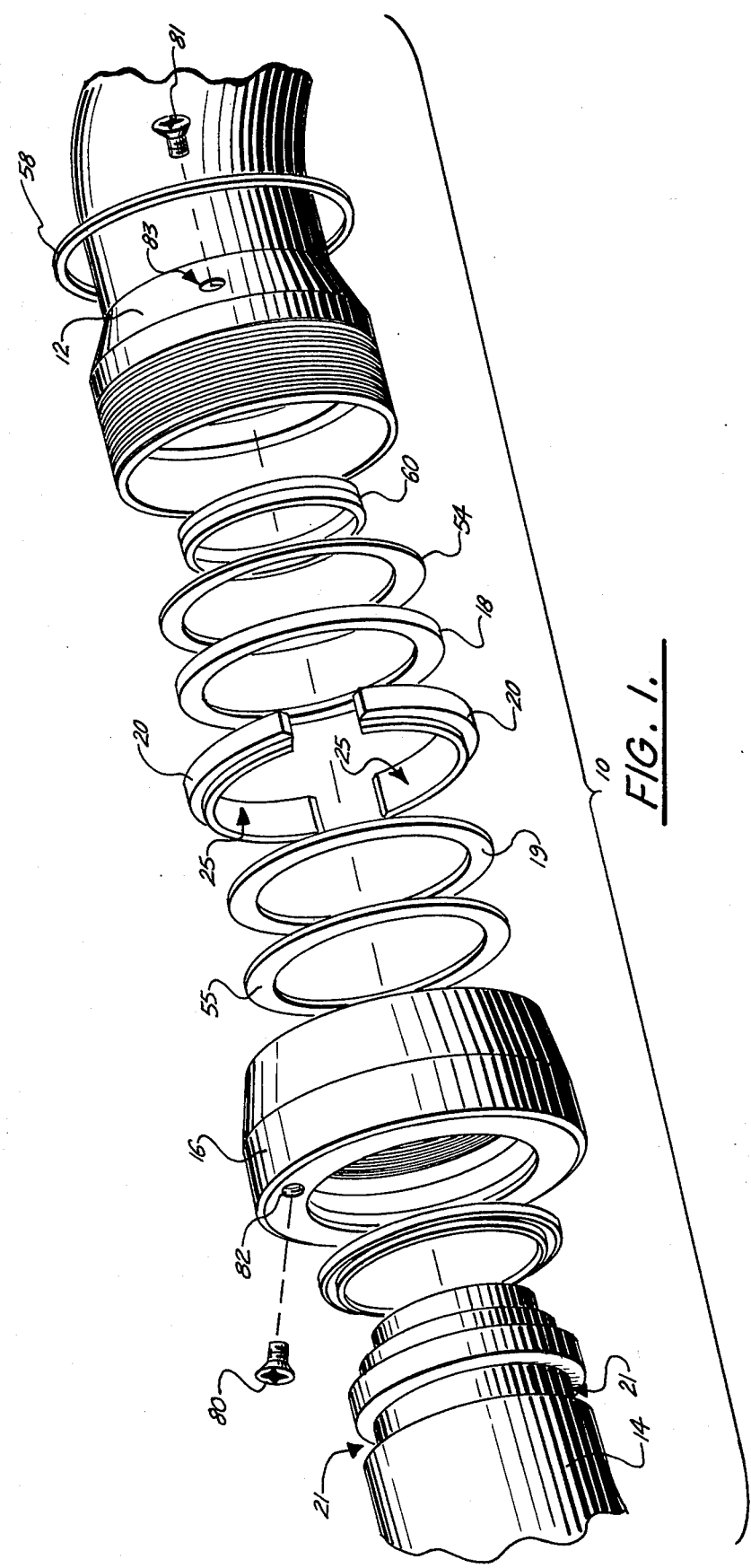

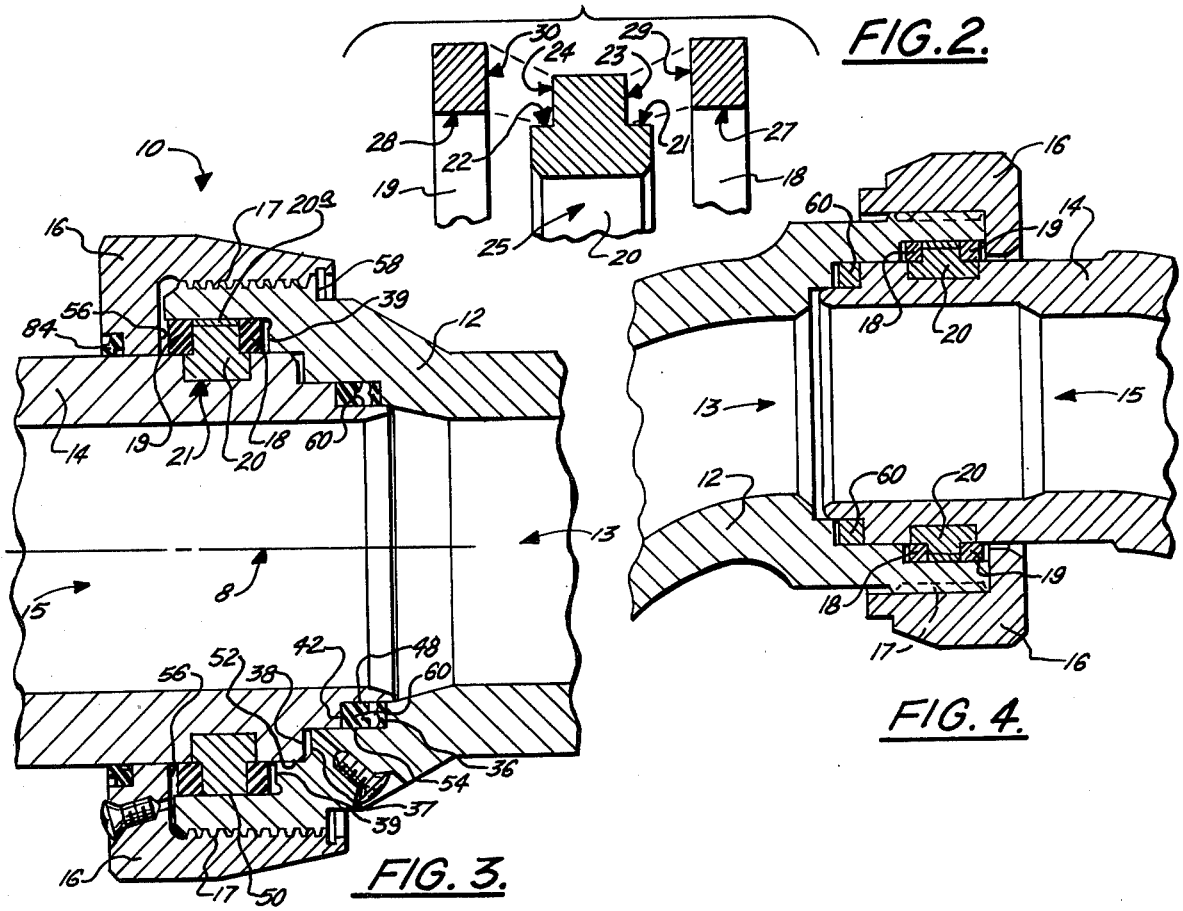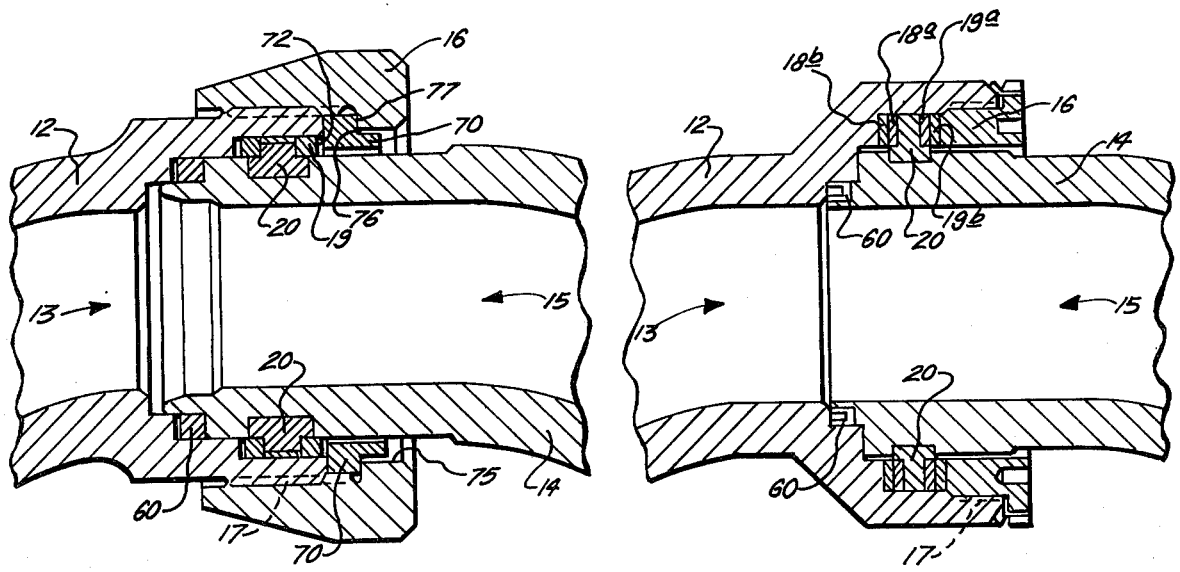

SWIVEL JOINT

BACKGROUND OF THE INVENTION

1. Technical Field

The present invention relates to swivel joints between adjacent pipe sections so that coaxial rotation can occur between the sections. More particularly, the present invention relates to a swivel joint which provides improved radial and thrust load transfer in the swivel joint.

2. General Background

In petroleum drilling, producing and servicing operations it is often advantageous to provide a flexible connection for adjacent pipe sections. This flexibility is normally provided through one or more swivel joints and swivel elbows arranged in such a manner as to allow relative rotation of two sections of piping in one or more planes. This relative movement at a joint is especially useful during the initial installation of a piping system, especially when the piping is temporary and will be removed and reinstalled numerous times during the life of the units.

Swivel joints have been used in many oil and gas well "service" applications where high pressure piping is connected between a truck (manifold units, pump trucks, blender trucks, etc.) and the wellhead for pumping "service" fluids at high pressures into a well formation or for testing the flow of petroleum fluids from the well formation. Such service fluids include acids, propants, gases, water mixtures and the like, which are used to stimulate the well formation or to "fracture" the formation to allow the petroleum to flow more freely. Such fluids also include special cements which seal off casing strings in the well bore or certain zones within the formation.

Swivel joints are also used in the piping systems of drilling rigs for oil and gas wells. These joints provide flexibility in piping used to handle drilling mud under pressure, certain types of flexible hydraulic lines used to control blowout preventor equipment, choke and kill lines associated with blowout preventor equipment, and temporary test lines which handle pressurized petroleum fluids from the well bore. Swivel joints are also used in piping connected to the wellhead for transmitting high pressure production oil and/or gas from the well.

Many conventional swivel joints use ball bearings to transmit the load between the connected pipe sections. Problems have been found in these types of swivel joints since they utilize ball bearings that move along raceways cut into the swivel body pieces. In these configurations, the surfaces of the raceways must be hardened in order to prevent the ball bearings from overloading when the swivel is under pressure. This hardening of the raceway surfaces is expensive and tends to reduce the impact, fatigue and/or low temperature resistance of the swivel member.

Another problem found in swivel joints which utilize ball bearings is in the assembly and disassembly of the units, especially during replacement of bearings and seals. It is often necessary, for example, to rotate or even disconnect the piping connected to the swivel joint in order to disassemble the swivel section. These assembly and disassembly operations are time-consuming and can give rise to assembly errors.

Many conventional ball bearing swivels are unduly heavy and unmanageable which causes problems since they have to frequently lifted and positioned manually. Ball bearing raceways are also susceptible to heavy wear such as "galling," "spalling" or indentation. Such wear can ultimately result in leakage of the compressive type seal normally used with conventional ball bearing swivels, resulting in the need to replace the expensive body piece.

Due to space requirement, ball bearing type swivel joints also tend to limit the radius of a flow passage possible for a given overall envelope size. By placing restrictions on the radius of the swivel joint elbow, swivel joints cannot use a larger flow radius in the elbow in order to reduce the eroding effects of abrasive fluids.

Swivel joints that use solid annular bearings instead of ball bearings have been suggested and several configurations are taught in U.S. Pat. Nos. 2,705,651; 3,384,428; 4,079,969 and 4,205,866. These joints, however, have limited strength because the loads are distributed from one pipe to another only through the bearing. Many of these joints also have separate radial and thrust bearings which add to the complexity and cost of the joint. Many also have bearings exposed to abrasive fluids flowing through the joint which reduces bearing life.

SUMMARY OF THE INVENTION

The present invention represents an improvement over prior art swivel joints by providing a swivel joint which is simple in design, easy to assemble and disassemble and relatively inexpensive to manufacture and maintain. Replaceable inexpensive parts take most of the wear, prolonging useful life and lowering operating costs.

The present invention is directed to a swivel joint for handling fluids which is used to connect open-ended male and female pipe sections. A retainer in the form of an annular split ring is mounted circumferentially about the male pipe section in a groove formed on its outer surface. The split ring includes thrust and radial transfer surfaces which cooperate with complementary surfaces formed on solid annular bearings which are disposed generally between the split ring and the female pipe section. The complementary surfaces transmit both radial and thrust loads through the split ring and bearing. An assembly nut connects the male and female pipe sections, split ring and bearing together.

The thrust and radial transfer surfaces include first and second annular surfaces on the split ring which are perpendicular relative to each other, the bearing being rectangular or square in cross-section and having complementary perpendicular surfaces. The preferred embodiment also includes a ring which is generally tee-shaped in longitudinal cross-section for accommodating a pair of combined radial and thrust bearings which are spaced apart on opposite sides of the split ring. A seal is provided between the male and female pipe sections for preventing fluids from leaking into the bearings. The seal can be disposed between an annular shoulder formed on the outer end portion of the male pipe section and the inner surface of the female pipe section.

This type of swivel joint is stronger than ones in the prior art because load is transmitted to the bearings through the retainer ring which is itself a load bearing member. Thus, in the composite structure of the inventive swivel joint, load is distributed through more structural members than just the bearing. Further, the number of working parts is significantly reduced because the bearings perform both thrust and radial load functions. None of the bearings is exposed to abrasive fluid which promotes longer bearing wear and less maintenance.

BRIEF DESCRIPTION OF THE DRAWINGS

For a better understanding of the invention, reference should be had to the following detailed description of preferred embodiments, taken in conjunction with the accompanying drawings, in which:

FIG. 1 is an exploded, perspective view of the component parts of a preferred embodiment of the swivel joint of the present invention;

FIG. 2 is a fragmentary, longitudinal, cross-sectional view of the split ring and bearing portions of the swivel joint shown in FIG. 1;

FIG. 3 is a longitudinal, cross-sectional view of the swivel joint shown in FIG. 1 when it is assembled;

FIG. 4 is a longitudinal, cross-sectional view of another embodiment of the swivel joint of the present invention;

FIG. 5 is a longitudinal, sectional view of a third embodiment of the swivel joint of the present invention; and FIG. 6 is a longitudinal, sectional view of a fourth embodiment of the swivel joint of the present invention.

DETAILED DESCRIPTION OF PREFERRED EMBODIMENTS

Referring to the drawings, reference numeral 10 generally refers to a swivel joint that is used to provide a flexible connection between a female open-ended pipe section 12 having a flow bore 13 and a male open-ended pipe section 14 having a flow bore 15. Pipe sections 12, 14, are adapted to connect concentrically as shown in FIGS. 3-6 with their end sections overlapping to form a common central flow bore having a longitudinal axis B. As will be described in greater detail below, pipe sections 12, 14, are connected so that they can rotate with respect to one another, the male pipe section 14 being supported within the female pipe section 12 by a composite bearing arrangement comprising bearings 18, 19, and a retaining means in the form of a split ring 20. A nut 16 holds the pipe sections 12, 14, together as shown in FIGS. 3-6 through cooperating threads 17 (see FIG. 3). As described in greater detail below, the bearings 18, 19, and split ring 20 operate to distribute both thrust and radial loads between the connected pipe sections to provide a strong, long-lasting, easy to maintain, swivel joint.

Referring specifically to FIGS. 1, 2 and 3, an annular groove 21 is formed on the outer surface of the pipe section 14 for receiving the split ring 20. The split ring 20 is tee-shaped in longitudinal, cross-section (see FIG. 2), forming annular bearing surfaces 21, 22, that are coextensive with the outer surface of the pipe section 14. The split ring also includes annular bearing surfaces 23, 24, which are disposed perpendicular to the surfaces 21, 22. As shown best in FIG. 2, an innermost annular surface 25 fits within the groove 21 so that the surfaces 21, 22 form an extension of the outer surface of the pipe section 14. The bearings 18, 19, are mounted on the split ring 20 at the surfaces 22, 24 and 21, 23, respectively.

The bearings 18, 19 are wider than the surfaces 21, 22 and also engage the outer surface of the pipe section 14. The bearings 18, 19, are also longer than the surfaces 23, 24, so that the bearings project beyond the outer surface of the split ring 20 and engage the inner surface of the pipe section 12. A spacer 20a can be provided between the split ring 20 and inner surface of the pipe section 12. The bearings 18, 19, are therefore spaced apart by and supported in both a normal and circumferential direction of the split ring 20. The bearings 18, 19, and split ring 20 form a composite load carrying section between the pipe sections 12, 14. This configuration allows both radial and thrust loads to be transferred from pipe section 14 to pipe section 12 through the split ring 20 and bearings 18, 19, the split ring 20 operating as part of the load bearing configuration and making the joint stronger than if only the bearings carried the load. Since the bearings 18, 19, function to carry both thrust and radial loads, two bearings can be used to accomplish the same function as four bearings.

The external surface of the outer end of male pipe section 14 and the inner surface of the outer end of female pipe section 12 have corresponding stepped annular shoulders as shown best in FIG. 3. These stepped sections are designated by reference numerals 36, 37 and 39 for pipe section 12 and 38, 42 for pipe section 14, and are separated by annular circumferential surfaces 46, 48 on section 14 and surfaces 50, 52 and 54 on section 12.

The nut 16 is used to connect the pipe sections 12, 14 and includes an inner shoulder 56 which, in combination with the shoulder 39 of pipe section 12, operates to hold the bearings 18, 19 against the split ring 20. The annular surfaces 39, 56 also receive and transmit thrust loads to bearings 18, 19. If desired, spacers 90, 55 (see FIG. 1) can be positioned between the surfaces 39, 56 and bearings 18, 19. The nut 16 can be retained in an assembled position by the use of a snap ring 58. A seal 60 is located between the outer end of pipe section 14 and the inner surface of pipe section 12 to prevent fluid flowing through the pipe sections from leaking into the bearings 18, 19, and to retain lubricant around bearings 18, 19 which is added through bleeder ports 82, 83, that are closed by screws 80, 81. The seal 60 occupies the space defined by the shoulders 36, 42. A dust seal 84 is located between the nut 16 and outer surface of the male pipe section 14 for preventing dust and other foreign elements from contacting the bearings.

In the embodiment shown in FIG. 4, one of the "steps" has been eliminated so that the outer surface of the seal 60 is coextensive with the outer surface of the pipe section 14. This configuration allows the swivel 10 to have a smaller diameter since the walls of the pipe sections are narrower because there are no annular shoulders along their length.

In the embodiment shown in FIG. 5, the nut 16 is accompanied by annular retainer element 70 which includes an annular shoulder 72 that laterally abuts the bearing 19. The element 70 and nut 16 provide cooperating abutting shoulders 76, 77, respectively, for holding the element 70 in place when the nut 16 is mounted on the pipe section 12. An inner bore 75 of the nut 16 is enlarged which allows the nut 16 to slide around an elbow in the pipe section 14 for easier handling during assembly or disassembly of the swivel joint. The embodiment shown in FIG. 5 would be useful where a pipe section 12 or 14 is not straight and too short to allow assembly of the configurations of FIGS. 3 and 4.

In the embodiment of FIG. 6, two bearings 18a, and 18b and 19a, 19b are provided on each side of the split ring 20. Rotation occurs between retainer bearings 18a, 19a (which abut split ring 20) and outer bearings 18b, 19b, respectively. The nut 16 is internally connected at the threaded interface 17 between the inner surface of the pipe section 12 and the nut 16.

The bearings 18, 19 can be formed as solid annular members of an aluminum-bronze alloy. The washers 90, 55 are formed of Teflon. The split ring 20 could also be formed of an aluminum-bronze alloy.

The composite bearing and retainer structure provides a combined thrust-radial bearing configuration which forms a stronger joint since loads are transmitted through the split ring as well as the bearings. Since all the bearings are isolated from fluid flowing through the pipe sections, bearing wear is reduced adding to longer life and lower maintenance and repair costs.

Because the invention may vary and still be within the scope of the inventive concept, and because many modifications may be made to the invention, it is to be understood that the details herein are to be interpreted as illustrative and not limiting and that all such variations and modifications are intended to fall within the scope of the appended claims.

What is claimed as the present invention is:

1. A swivel joint for handling fluids at pressures as high as 20,000 psig comprising:
    a. open ended male and female pipe sections having bores extending therethrough, the pipe sections adapted to connect concentrically and rotatably with the open-end portions overlapping to form a common central flow bore; said male pipe section having a circumferential groove formed in the outer surface
    b. an annular split ring mounted circumferentially in said groove about the male pipe section, said split ring being generally tee-shaped in longitudinal cross-section and comprising at least two segments defining longitudinal annular gaps therebetween, said split ring further comprising:
       at least one thrust load transfer surface; and
       at least one radial load transfer surface disposed perpendicularly to said thrust load transfer surface and disposed in alignment with the outer surface of said male pipe section adjacent said groove;
    c. at least two annular bearings disposed at opposite sides of said split ring and engaging the inner surface of said female pipe section and said thrust load transfer surface, said radial load transfer surface and said outer surface of said male pipe section adjacent said groove; and
    d. means for concentrically and rotatably connecting the male and female pipe sections together.

2. The swivel joint of claim 1, wherein the bearing means includes a solid annular bearing ring.

3. The swivel joint of claim 1, and further comprising first seal means for preventing fluid from the flow bore from leaking to the bearing means.

4. The swivel joint of claim 3 wherein the male pipe section includes an annular shoulder on its outer end and the first seal means includes an annular resilient seal mounted around said shoulder and shaped to engage the inner surface of the female member for sealing the bearing means from fluid in the pipe sections.

5. The swivel joint of claim 4, wherein the outer surface of the male pipe section and inner surface of the female pipe section includes a stepped section of reduced diameter between the bearing means and first sealing means.

6. The swivel joint of claim 1 wherein said means for connecting the male and female pipe sections further comprises:
    a cap threadedly engaged to said female pipe section, said cap having at least one longitudinal bore therethrough, said bore being in direct flow communication with said longitudinal annular gap formed between said segments of said split ring.

7. The swivel joint of claim 1 wherein said means for connecting the male and female pipe sections further comprises:
    a male pipe section having a curvature adjacent its end disposed within said female pipe section;
    a nut threadedly connected to said female pipe section formed having a central bore therethrough, said central bore permitting mounting of said nut over said male pipe section; and
    an annular retainer element disposed between said nut and the end of said female section, thereby retaining at least one of said annular bearings against said split ring.

8. The swivel joint of claim 1 wherein said means for connecting the male and female pipe sections further comprises:
    a cap formed having a central bore adapted to receive said male pipe section, said cap further including a bearing retaining surface adjacent said bore and an annular female threaded section adjacent said bearing retaining surface; and
    said female pipe section is formed having male threads on end to receive said cap, said annular female threaded section of said cap overlying said male threads of said female pipe section which in turn overlies said split ring and said bearings, thereby increasing the ability of the assembly to withstand hoop stresses imposed by internal pressures in said male and female pipe sections.

* * * * *

UNITED STATES PATENT AND TRADEMARK OFFICE
CERTIFICATE OF CORRECTION

PATENT NO. : 4,478,438
DATED : October 23, 1984
INVENTOR(S) : PETER ELORRIAGA, JR.

It is certified that error appears in the above-identified patent and that said Letters Patent is hereby corrected as shown below:

In column 2, line 1, please insert --be-- between the words "to" and "frequently".

Signed and Sealed this

Twenty-fifth Day of June 1985

[SEAL]

Attest:

DONALD J. QUIGG

*Attesting Officer*     *Acting Commissioner of Patents and Trademarks*